United States Patent
Wu et al.

(10) Patent No.: US 7,970,078 B2
(45) Date of Patent: *Jun. 28, 2011

(54) METHOD AND RECEIVER FOR ESTIMATING THE CHANNEL IMPULSE RESPONSE USING A CONSTANT MODULUS INTERFERENCE REMOVAL ITERATION

(75) Inventors: Huan Wu, Kanata (CA); Sean Simmons, Waterloo (CA); Zoltan Kemenczy, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 12/686,453

(22) Filed: Jan. 13, 2010

(65) Prior Publication Data

US 2010/0111233 A1 May 6, 2010

Related U.S. Application Data

(63) Continuation of application No. 11/398,043, filed on Apr. 5, 2006, now Pat. No. 7,672,412.

(51) Int. Cl.
*H04L 27/00* (2006.01)
*H04L 25/08* (2006.01)
*H04B 1/10* (2006.01)

(52) U.S. Cl. .......... 375/316; 375/346; 375/350

(58) Field of Classification Search .......... 375/229–231, 375/316, 340, 350
See application file for complete search history.

(56) References Cited

U.S. PATENT DOCUMENTS

| | | | | |
|---|---|---|---|---|
| 5,164,961 A * | 11/1992 | Gudmundson | ............ | 375/229 |
| 5,363,412 A * | 11/1994 | Love et al. | ............ | 375/341 |
| 6,393,068 B1 * | 5/2002 | Rupp | ............ | 375/326 |
| 6,570,917 B1 * | 5/2003 | Lai et al. | ............ | 375/232 |
| 6,584,150 B1 * | 6/2003 | Wu et al. | ............ | 375/231 |
| 6,650,716 B1 * | 11/2003 | Ratnarajah | ............ | 375/347 |
| 6,714,607 B2 * | 3/2004 | Kobylinski et al. | ............ | 375/341 |
| 6,931,030 B1 * | 8/2005 | Dogan | ............ | 370/509 |
| 7,006,811 B2 * | 2/2006 | Pukkila | ............ | 455/278.1 |
| 7,012,966 B2 * | 3/2006 | Li | ............ | 375/267 |
| 7,342,972 B1 * | 3/2008 | Giannakis et al. | ............ | 375/259 |
| 2003/0021332 A1 * | 1/2003 | Li | ............ | 375/147 |
| 2003/0043887 A1 * | 3/2003 | Hudson | ............ | 375/144 |
| 2003/0210741 A1 * | 11/2003 | Fimoff et al. | ............ | 375/232 |

(Continued)

FOREIGN PATENT DOCUMENTS

CA 2552443 * 2/1996

(Continued)

OTHER PUBLICATIONS

Pukkila et al., "Cochannel Interference Suppression for Constant Modulus Signals," IEEE Communications Society, 2004, pp. 2548-2552.*

(Continued)

*Primary Examiner* — Tesfaldet Bocure
(74) *Attorney, Agent, or Firm* — Allen, Dyer, Doppelt, Milbrath & Gilchrist, P.A.

(57) ABSTRACT

A receiver and associated method estimates a channel impulse response of the communications signal. A communications signal is received as a burst of transmitted symbols, including a known training sequence. The joint estimation of timing offset and initial channel impulse response is determined based on the cross-correlations of the known transmitted symbols and received communications signal. A constant modulus interference removal iteration is applied to improve the initial channel impulse estimation.

20 Claims, 6 Drawing Sheets

U.S. PATENT DOCUMENTS

| | | | |
|---|---|---|---|
| 2004/0127260 A1* | 7/2004 | Boros et al. | 455/562.1 |
| 2004/0170234 A1* | 9/2004 | Pukkila et al. | 375/340 |
| 2004/0171364 A1* | 9/2004 | Pukkila | 455/226.1 |
| 2004/0184568 A1* | 9/2004 | Kobylinski et al. | 375/341 |
| 2004/0192215 A1* | 9/2004 | Onggosanusi et al. | 455/67.13 |
| 2004/0240595 A1* | 12/2004 | Raphaeli | 375/350 |
| 2005/0111538 A1* | 5/2005 | Wernaers | 375/229 |
| 2005/0152485 A1* | 7/2005 | Pukkila et al. | 375/348 |
| 2006/0034380 A1* | 2/2006 | Li | 375/260 |
| 2006/0062333 A1* | 3/2006 | Yan | 375/340 |
| 2007/0173277 A1* | 7/2007 | Yun | 455/522 |
| 2009/0052561 A1* | 2/2009 | Baxley et al. | 375/260 |

FOREIGN PATENT DOCUMENTS

| | | | |
|---|---|---|---|
| CA | 2273377 | * | 12/1999 |
| EP | 1843533 | * | 12/2004 |

OTHER PUBLICATIONS

Yongjun Deng, et al., "Robjust LMMSE Turbo Equalization Algorithm to Imperfect Channel Estimations," Vehiclular Technology Conference, IEEE, Sep. 25, 2005, pp. 1402-1406.*

Sezginer et al., "An Improved Matched Filter Based Symbol Synchronizer for MSK Transmission Over Fading Multipath Channel,"Vehicular Technology Conference, IEEE Sep. 26, 2004, pp. 1678-1682.*

Ali A. Nasir, "Modified Constant Modulus Algorithm for Joint Blind Equalization and Synchronization," IEEE, 59-64.*

* cited by examiner

METHOD AND RECEIVER FOR ESTIMATING THE CHANNEL IMPULSE RESPONSE USING A CONSTANT MODULUS INTERFERENCE REMOVAL ITERATION

RELATED APPLICATIONS

This application is a continuation of Ser. No. 11/398,043 filed Apr. 5, 2006, now U.S. Pat. No. 7,672,412 issued Mar. 2, 2010, the disclosure of which is hereby incorporated by reference in its entirety.

FIELD OF THE INVENTION

The present invention relates to the field of communications systems, and more particularly, to estimating the channel impulse response for reducing interference within communications systems.

BACKGROUND OF THE INVENTION

Cellular networks are expanding as more users turn to mobile devices as their primary and secondary communications devices, thus requiring an increase in the amount of wireless infrastructure. The increased load demands on the infrastructure often causes network congestion. This mandates an increase to the capacity of the communications networks, such as the GSM/GPRS (General Packet Radio Service), to reduce interference. Different proposals to increase capacity and reduce interference include systems for frequency planning or quality of signal control, power control schemes, and mobile station performance enhancement systems.

Wireless and cellular networks also suffer from increased interference emanating from other users, such as neighboring cells on the same frequency, known as co-channel interference (CCI), or interference emanating from neighboring frequencies on the same cell, known as adjacent channel interference (ACI). A single-antenna interference cancellation (SAIC) system is sometimes used to counter CCI. The use of this type of system has been standardized by the 3G-partnership project (3GPP), as the technical specification group (TSG) for the GSM/EDGE radio-access network (GERAN).

SAIC can reduce interference using Downlink Advanced Receiver Performance (DARP) techniques, as adopted by the 3GPP. The 3GPP technical specification 05.05V8.11, entitled the Third Generation Partnership Project, Technical Specification Group GSM/EDGE Radio Access Network, Radio Transmission and Reception, is hereby incorporated by reference in its entirety. This specification describes the requirements for different components used in such communications systems, for example, the transceivers, base stations, and other components.

Different SAIC algorithms used as interference reduction systems have been proposed, including a constant modulus method and joint demodulation method (JDM), which uses the joint demodulation of the user and an interference sequence. These systems typically begin with a standard least-squares (LS) estimate of a propagation channel, and a static channel profile for an interferer. A joint branch metric can be minimized using modified Viterbi systems, and any estimated sequences for an interfering signal in a least mean squares (LMS) algorithm can update channel estimates for a desired interfering propagation channel.

Such systems are disclosed in U.S. Pat. No. 7,006,811, U.S. Patent Publication No. 2004/0170234, and an article by the Nokia Research Center entitled Co-Channel Interference Suppression For Constant Modulus Signals. These systems describe an iterative method for improving channel impulse response (CIR) estimation. In such systems, the timing offset of a training sequence is presumed to be perfectly known. This assumption, however, cannot always be held, and a valid assumption could be that the timing offset is randomly distributed over a number of symbols. Thus, the CIR and timing offset could be jointly estimated.

BRIEF DESCRIPTION OF THE DRAWINGS

Other objects, features and advantages will become apparent from the detailed description which follows, when considered in light of the accompanying drawings in which.

DETAILED DESCRIPTION OF THE PREFERRED EMBODIMENTS

Figure 1A:
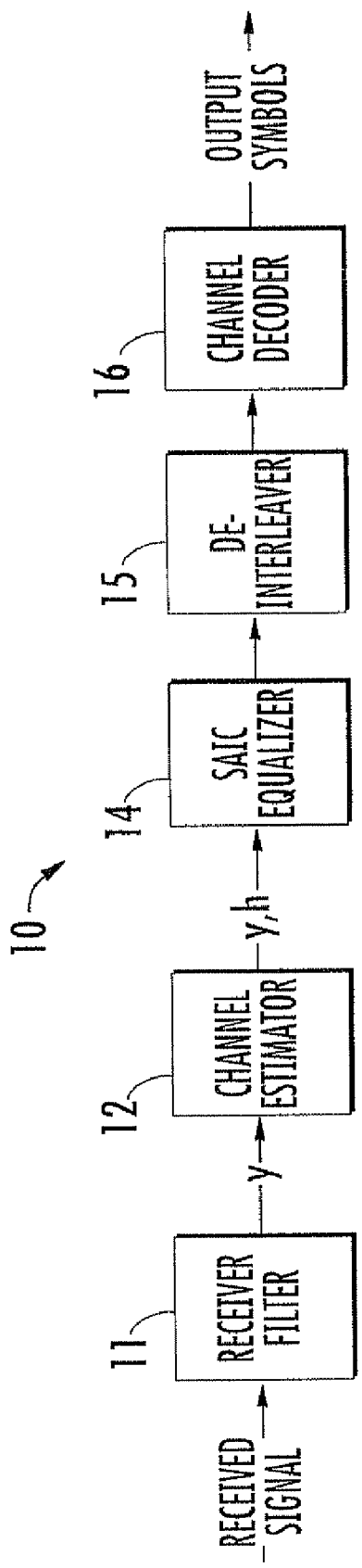
FIG. 1A is a block diagram of components of a known receiver that could be used for a constant modulus interference removal iteration.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A receiver and associated method estimates a channel impulse response of a communications signal transmitted within a wireless communications system. A communications signal is received as a burst of transmitted symbols including a known training sequence. The timing offset is determined by peak cross-correlation between the received signal and the known training sequence. An initial channel impulse response is estimated based on the cross-correlations at the timing offset. A constant modulus interference removal iteration is applied to improve the initial channel impulse estimation.

In accordance with another aspect, channel parameters are estimated as channel impulse response components that are processed for estimating the initial channel impulse response. A least squares (LS) estimation can be applied in some cases for estimating channel parameters. The timing offset of the known training sequence of the transmitted symbols is randomly distributed over a number of symbols. At least about three iterations are applied and can be implemented using a digital signal processor (DSP). A communications signal is typically formed in accordance with a global system for mobile communications (GSM).

In yet another aspect, a channel estimator circuit and equalizer circuit are used. The equalizer circuit can be formed as a single antenna interference cancellation equalizer circuit, although it should be understood that conventional non-SAIC and SAIC receivers can be used.

As is known to those skilled in the art, the accuracy of the channel impulse response (CIR) estimation typically has a direct impact on the error rate performance of a GSM receiver, as specified by 3GPP, for example, in sensitivity and interference reference performance test cases. A least squares (LS) CIR estimator, however, does not always provide an appropriate margin for some test cases. The described embodiments explained below improve the CIR estimation to ensure that mobile wireless communications devices, for example, handhelds, pass test cases with a significant comfort margin.

In accordance with non-limiting examples of preferred embodiments, to reduce the computation in the case of joint timing and CIR estimation, it is possible to start with a cross-correlation based timing and CIR estimation, and apply the CMIR iterations to the initial CIR estimation from the cross correlations. The penalty for this process was found to be less than ⅓ dB in the SIR/SNR (Signal-to-Interference/Signal-to-Noise) region of interest. Furthermore, the required number of iterations can be substantially reduced by finding an appropriate step size for the iterations. By applying the iterative CMIR (Constant Modulus Interference Removal) to improving the CIR estimation, and leaving any Viterbi equalizer metrics unchanged, the performance in both interference and AWGN (Additive White Gaussian Noise) dominant cases can be improved. For example, the implementation in a 16-bit DSP showed that a 3-iteration CMIR costs 5808 DSP cycles, about 5 MIPs (million instructions per second) for four slots down and 1.25 MIPs for a single slot GSM. It improves the FER/RBERib (Frame Error Rate/Residual Bit Error Rate) performance by 0.5~1.5 dB (decibel) compared with the current LS CIR estimator.

The embodiments as described differentiate prior art solutions in several aspects, including but not limited to:

1) The process and receiver starts with the cross-correlation based timing and CIR estimation, which greatly reduces the computation while minimizing the performance loss. The cross-correlation is done by convolving the full length of the training sequence with the received signal, and a smoothing window, optimized with a length of three symbols, is applied to the cross-correlation to improve the timing estimation. The computation is further reduced by substantially reducing the number of required iterations; and 2) The overall solution is simplified by applying the iterative CMIR to improving CIR estimation and leaving the equalizer structure unchanged. It eliminates the performance loss in Additive White Gaussian Noise (AWGN) cases.

Figure 1B:
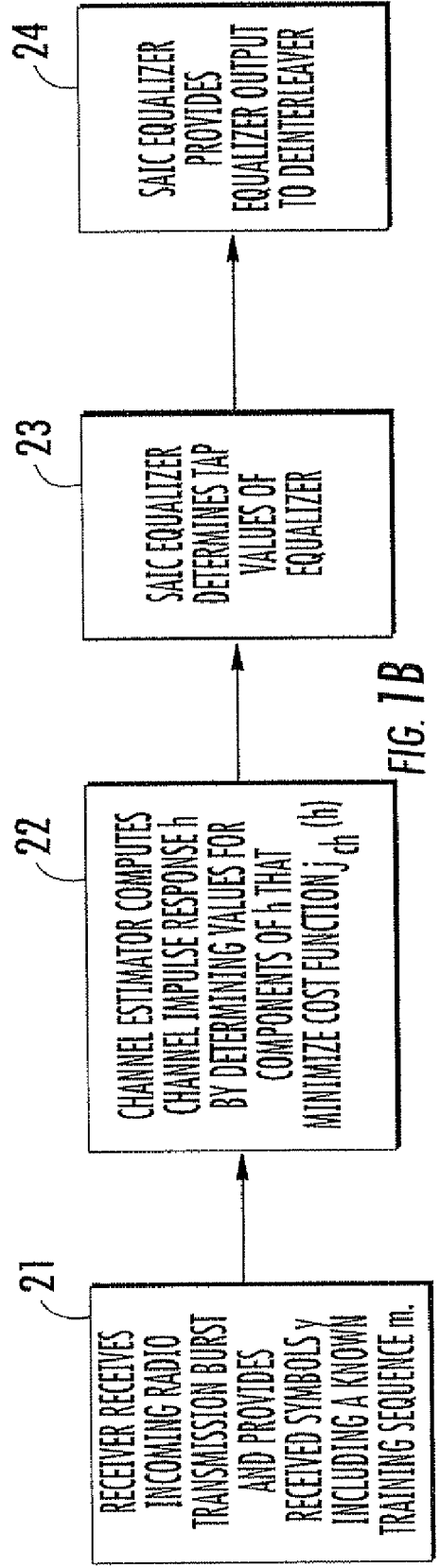
FIG. 1B is a flowchart showing a method of operation of a known receiver such as used with the components of FIG. 1.

For purposes of illustration, a known series of components and process are described relative to FIGS. 1A and 1B. The described prior art receiver is typically part of a mobile station or base station of a radio access network, and the described method of operation relates to providing interference cancellation according to a single antenna interference cancellation (SAIC) algorithm, using a channel estimator to estimate channel impulse response components for use by a SAIC equalizer. This method as described can use an iterative Least to Mean Squares procedure to minimize a cost function.

Referring now to FIG. 1A, a cellular network communications receiver 10 includes a receive filter 11, which provides a filtered and sampled (base band) waveform with received samples indicated as components of a vector y. The filter 11 is followed by a channel estimator 12, for example, a constant modulus channel estimator, which assumes a constant modulus (constant signal power) for interfering signals. The received samples y are input to the channel estimator, which provides the values of the components of the channel impulse response h with components $h_i$. The components $h_i$ are used by later stages in the receiver in a nonlinear symbol or sequence detector, or in calculating tap values for a transversal filter used by the receiver in determining transmitted symbols from received symbols.

The channel estimator 12 in the embodiment shown provides the channel impulse response components $h_i$ to an equalizer 14, which is a single antenna interference cancellation equalizer. Other kinds of equalizers may be used with the channel estimator 12, or combinations of different kinds of equalizers may be used, with criteria for selecting one or another of the equalizers depending on measurements indicating which of the equalizers would be most suitable under current operating conditions. For example, a receiver might include both a SAIC equalizer and a conventional (non-SAIC) equalizer, and the channel estimator might provide the channel impulse response components $h_i$ to a selector module, along with a measurement indicating whether or not a strong interfering signal is present. The selector module could select either the SAIC equalizer or the conventional equalizer, depending on the measurement provided by the channel estimator module. The decision is usually made by comparing the measurement value with a predetermined threshold. A conventional (non-SAIC) equalizer could minimize either the sequence error probability, in what is typically called a Maximum-Likelihood Sequence Estimation (MLSE), or the symbol error probability, in what is typically called a Maximum A Posteriori (MAP) equalizer.

The SAIC equalizer 14 can use either a blind SAIC algorithm, or a joint detection SAIC algorithm. Further details of this algorithm are described in U.S. Patent Application Publication No. 2004/0170234 and article entitled, "Cochannel Interference Suppression for Constant Modulus Signals," identified above. The SAIC equalizer 14 in this example is followed by a deinterleaver circuit 15 and channel decoder 16 with output symbols.

Referring now to FIG. 1B, a method for operating a known receiver such as illustrated in FIG. 1A receives an incoming radio transmission burst (block 21) and provides K received symbols (samples) $y_i, \ldots, y_k$, including a known training sequence of P symbols $m_l, \ldots, m_p$. The channel estimator 12 uses the training sequence to compute the channel impulse response h by determining values for components of h that minimize cost function $J_{ch}(h)$ (block 22). The difference between samples of the received radio transmission burst and the corresponding channel response to the known training sequence are called interference samples. Since the difference is an average interference power (of an interfering signal), the cost function indicates a cumulative difference magnitude of power associated with the interference samples and the average interference power.

The SAIC equalizer 14 determines values for a filter in case of a linear SAIC equalizer 14 (block 23), or performs a trellis search in case of a nonlinear equalizer structure. The SAIC equalizer 14 provides the equalizer output (symbols according to, for example, the equalization filter) to the deinterleaver 15, which then provides deinterleaved symbols to the channel decoder 16 (block 24).

Figure 2:
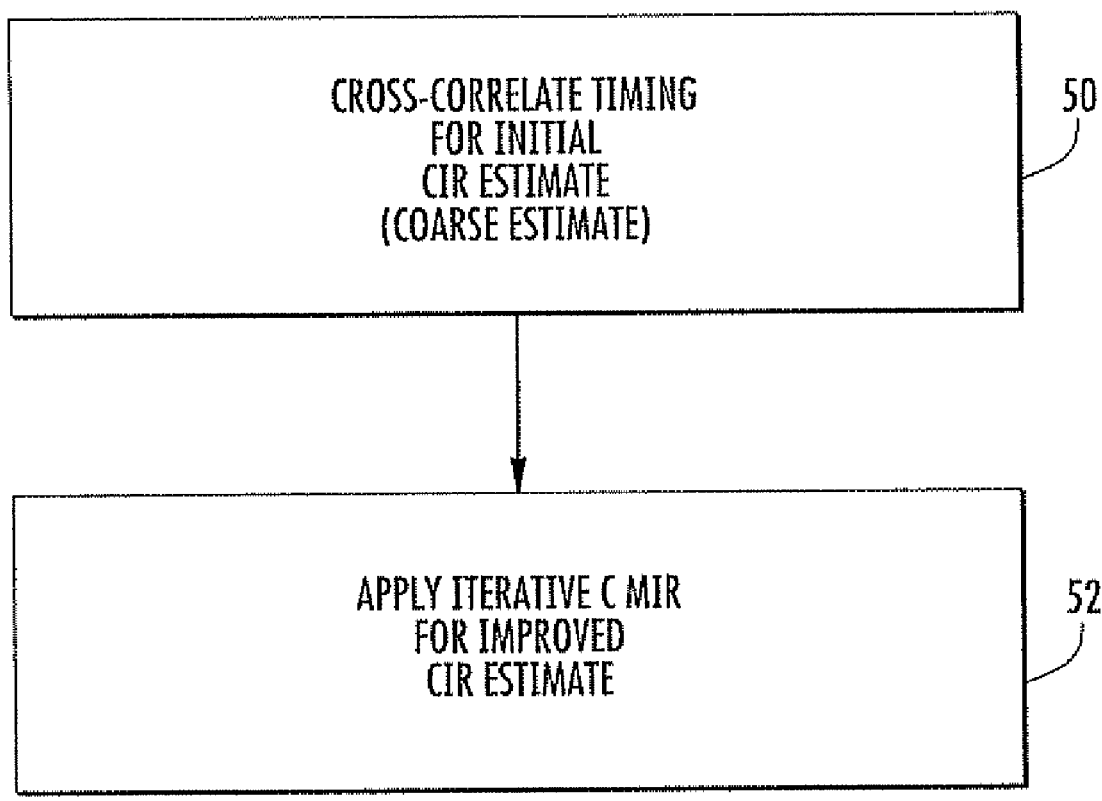
FIG. 2 is a high-level block diagram showing an example of the sequence flow used in a receiver and method for estimating the channel impulse response using an constant modulus interference removal iteration in accordance with a non-limiting embodiment.
Figure 3:
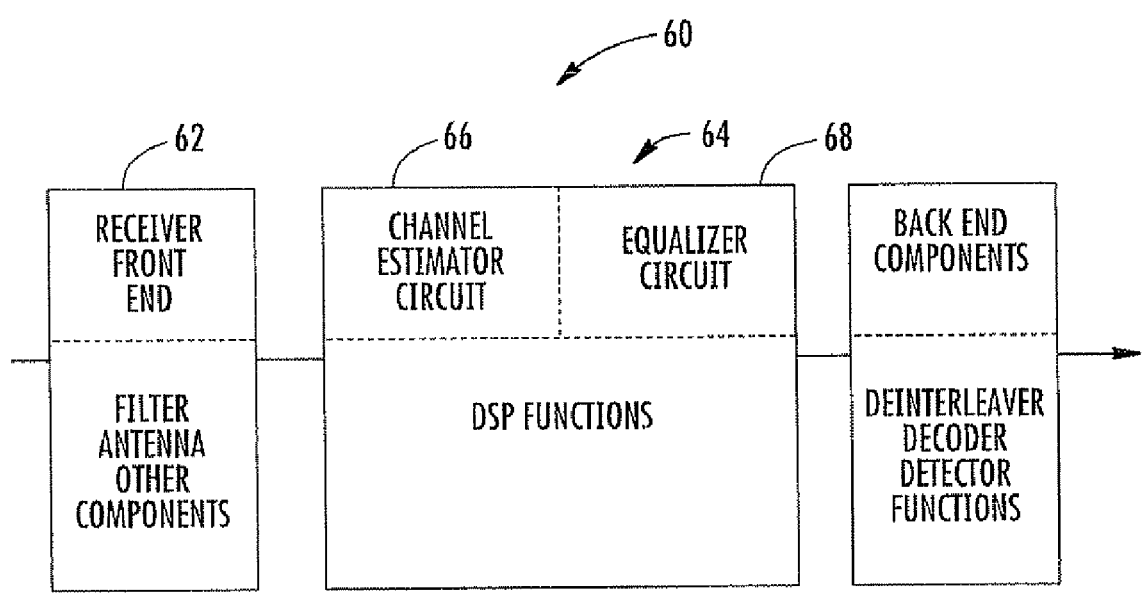
FIG. 3 is a high-level block diagram showing basic components used in the sequence example shown in FIG. 2.

As noted before, the channel impulse response (CIR) estimation has an impact on the error rate performance of a mobile GSM receiver. There now follows details of preferred embodiments as shown in the non-limiting examples of FIGS. 2-9. FIG. 2 illustrates a high-level sequence of operation in accordance with a non-limiting embodiment. FIG. 3 is a block diagram of a receiver in accordance with a non-limiting embodiment and showing its basic components.

As shown in FIG. 2, as a high-level example of a non-limiting embodiment, a cross-correlated timing occurs for an initial CIR estimate as a coarse estimate of CIR as shown in block 50. When the coarse estimate is obtained, the iterative CMIR is applied for an improved CIR estimate as shown in block 52. Thus, one distinguishing aspect with the embodiment as described is the initial CIR estimate, which could be considered a coarse estimate for CIR, followed by the CMIR iterations to obtain the improved CIR estimate.

FIG. 3 shows basic components of a receiver 60 and showing the receiver front end 62 as having a basic antenna and filter and related components. A main processing section 64 includes a channel estimator circuit 66 and equalizer circuit 68. The main processing circuit includes DSP functions to obtain channel estimation and perform channel equalization. The equalizer circuit can be formed as a Viterbi equalizer circuit. A digital signal processor can implement the constant modulus interference removal iteration. The channel estimator circuit 66 could apply a least squares (LS) estimation for estimating channel parameters. The equalizer circuit could include the taps based on estimated values of channel impulse response components.

As will be explained below, the known training sequence of transmitted symbols is typically randomly distributed over a number of symbols. There now follows a description of basic CIR estimation followed by details of preferred embodiments. The basic algorithms, in accordance with non-limiting examples, will now be described.

It should be understood that the conventional Least Squares (LS) CIR estimation minimizes the following cost function:

$$Q(h) = \sum_{k=1}^{P} |e_k(h)|^2 \qquad (1)$$

where $h=[h_1, h_2, \ldots, h_L]^T$ is the CIR vector of the desired signal and $$e_k(h) = x_k - \sum_{l=1}^{L} h_l s_{L+k-l} \qquad (2)$$

and $x_k$ and $s_{L+k-1}$ are the received samples and the known symbols of the training sequence. L is the number of taps the CIR and $p=P-L+1$, where P is the number of symbols in the training sequence.

In these systems, the cost function for CIR estimation is as follows:

$$J(h) = \sum_{k=1}^{P} [|e_k(h)|^2 - \bar{e}^2(h)]^2 \qquad (3)$$

where $$\bar{e}^2(h) = \frac{1}{p} \sum_{k=1}^{P} |e_k(h)|^2 \qquad (4)$$

The rationale behind (3) is that when noise is free and the interference has a constant modulus (envelope), the influence of the interference on CIR estimation is removed. Therefore, the cost function (3) is referred to as constant modulus interference removal (CMIR), although in reality the interference in the received signal hardly preserves the constant modulus property due to fading and multiple interferers. The cost function explained relative to (3) improves the CIR estimation for both interference and Additive White Gaussian Noise (AWGN) dominant cases.

Instead of trying to find the closed form solution for the minimization of (3), an iterative numerical solution can use a gradient-based search:

$$h(k+1)=h(k)-\mu \nabla_h J(h) \qquad (5)$$

where $\mu$ is the step size and $$\nabla_h J(h) = \frac{\partial J(h)}{\partial h^*} = \sum_{k=1}^{P} 2(|e_k|^2 - \bar{e}^2)\left(\frac{\partial |e_k|^2}{\partial h^*} - \frac{\partial \bar{e}^2}{\partial h^*}\right) \qquad (6)$$

$$\frac{\partial |e_k|^2}{\partial h^*} = -S_k^* e_k \qquad (7)$$

$$\frac{\partial \bar{e}^2}{\partial h^*} = \frac{1}{p} \sum_{k=1}^{P} \frac{\partial |e_k|^2}{\partial h^*} \qquad (8)$$

and $$S_k = [s_{k+L-1}, s_{k+L-2}, \ldots, s_k]^T \qquad (9)$$

The LS CIR estimation by (1) can be used as an initial value for the iteration, and a number of ten (10) iterations was used in various simulations.

It should be understood that the CMIR iteration can be applied if the timing offset of the burst is exactly known. Due to the time-varying nature of the GSM channel, the timing offset of the burst (and hence the offset of the training sequence) is assumed to be randomly distributed over a number of symbols. A straightforward extension of the CMIR to this case would be a joint timing offset and CIR estimation (assuming that the number of timing offsets is K):

--- for t = 1:K
    Initial CIR estimation $h_0$ by LS estimator (1);
    CMIR iterations by (4) - (9) to give an improved CIR h;
    Compute J(t, h) by (3);
end
Choose the $t_{opt}$ and $h_{opt}$ as the final timing offset and CIR estimation such that $$J(t_{opt}, h_{opt}) = \min_{t,h} J(t, h).$$

---

This first algorithm (LS-CMIR) can be for joint timing and CIR estimation.

The performance of this LS-CMIR algorithm was evaluated for a half rate speech channel in a typical urban fading condition and a gain of 1.5 dB over the conventional LS was observed in terms of frame erasure rate (FER). A concern is the complexity. Initial complexity estimation showed that about 2,000 DSP cycles would be needed for each of the CMIR iterations. This could be exorbitant for some applications, even with a modest number of timing offsets (e.g. K=7).

To reduce the computation load, the Algorithm can be modified by taking the CMIR iteration out of the timing search loop. The timing search is done jointly by the conventional Least Squares (LS) CIR estimation and the CMIR is applied to the final LS CIR estimation.

--- for t = 1:K
    CIR estimation h by LS estimator (1) - (2);
    Compute Q(t, h) by (1);
end
Choose the $t_{ls}$ and $h_{ls}$ as the final timing offset and CIR estimation such that $$Q(t_{ls}, h_{ls}) = \min_{t,h} Q(t, h)$$

Apply CMIR iterations on $h_{ls}$ by (4) - (9) to give an improved CIR $h_{opt}$;

---

This second algorithm (LS-CMIR1) can be for joint timing and CIR estimation.

While the computation load for CMIR is reduced by K-fold, the performance is degraded noticeably. Simulation for the same channel and fading conditions showed that about half of the gain in the first algorithm. LS-CMIR was lost in second algorithm, LS-CMIR1.

It was observed that the peak of the cross correlations between the known training sequence (TS) and the received samples provides a better timing offset estimation than the LS counterpart. This lead to a modification of the algorithm as indicated:

---

Compute the cross-correlations (xcs) between full TS and received samples covering the full timing offset range;
Filter the $|xcs|^2$ by a rectangular window with length XCINT;
Find the maximum of the filtered $|xcs|^2$. The corresponding timing offset $t_{xc}$ can be calculated and the associated CIR estimation $h_{xc}$ can be extracted from the xcs at the timing offset.
Apply CMIR iterations on $h_{xc}$ by (4)-(9) to give an improved CIR $h_{opt}$;

---

This third algorithm (XCF-CMIR1) can be used for joint timing and CIR estimation.

It was noted that XCINT=3 is an adequate choice for the timing offset estimation. A full training sequence, however, rather than a shortened training sequence, could be used. The simulation showed that the XCF-CMIR1 algorithm incurs very little loss comparing to the LS-CMIR algorithm in a low to medium carrier-to-interference (C/I) or signal-to-noise (S/N) region. The cross-correlation with a shortened TS (XCS-CMIR1) suffers loss similar to that of LS-CMIR1.

Figure 4:
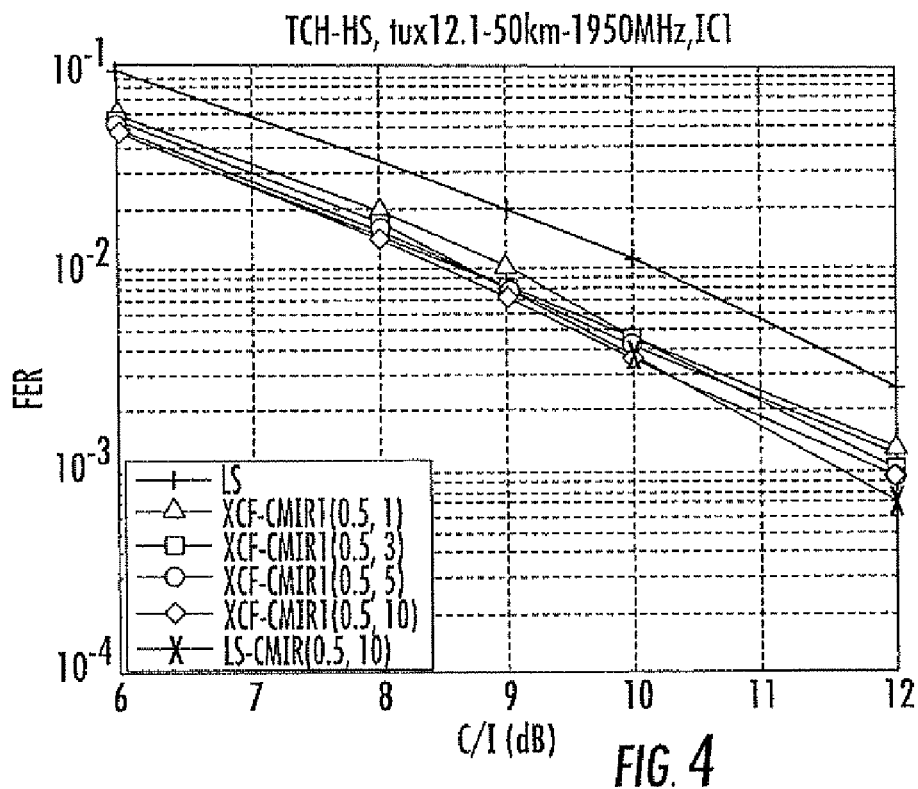
FIGS. 4 and 5 are graphs showing performance evaluations by using a different number of iterations in accordance with a non-limiting embodiment.
Figure 5:
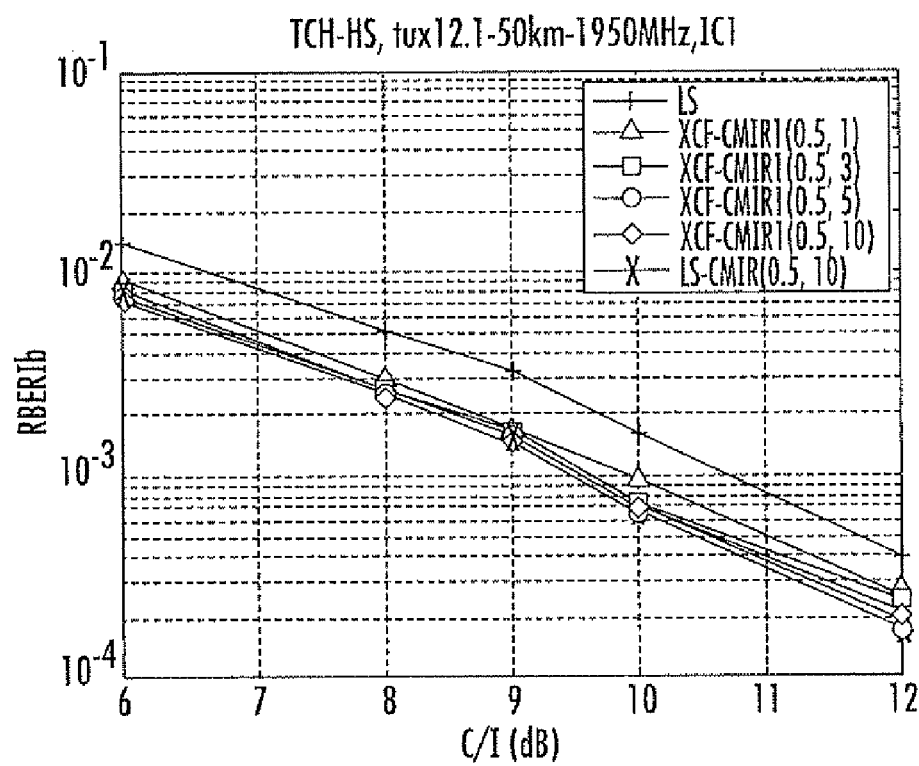
Figure 6:
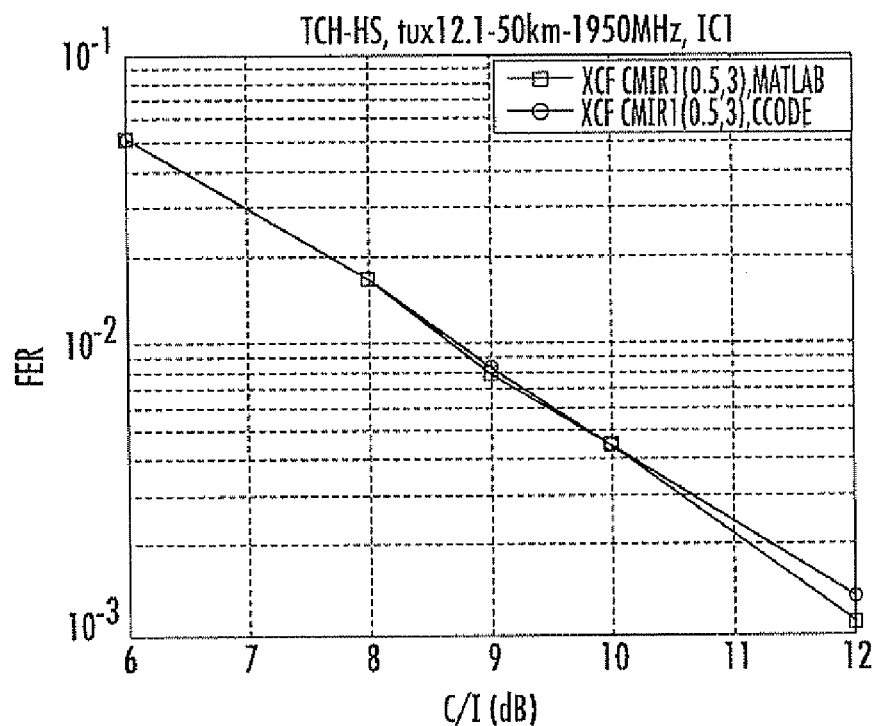
FIGS. 6 and 7 are graphs showing performance and verification of a digital signal processing (DSP) implementation in a GSM receiver, in accordance with a non-limiting embodiment.
Figure 7:
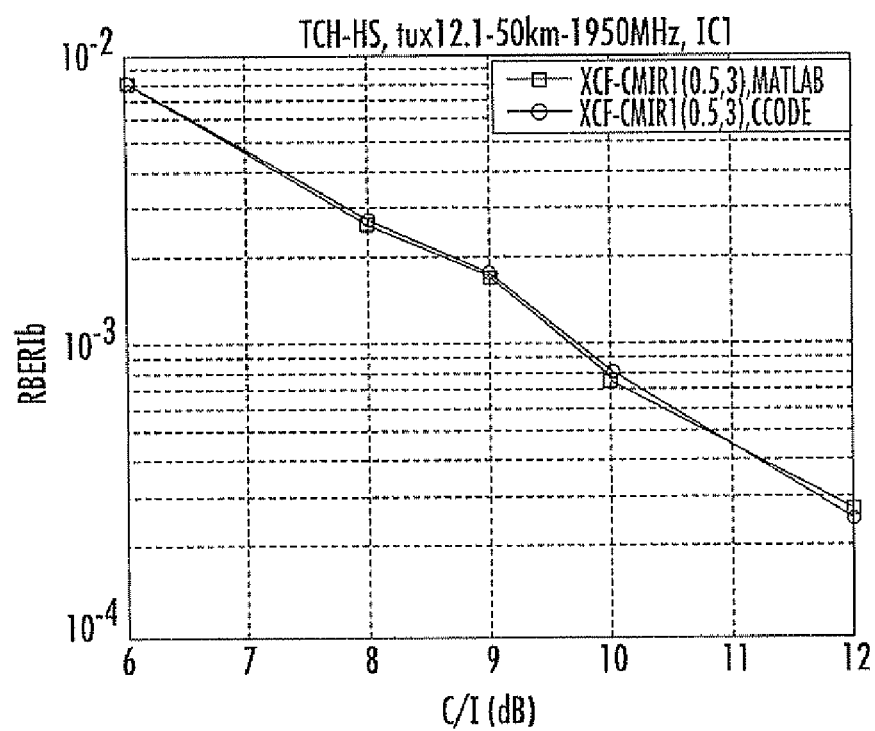

The number of iterations in the XCF-CMIR algorithm can be substantially reduced without significant loss if a proper step size is used. It is shown in the graphs of FIGS. 4 and 5 that acceptable performance can be achieved with an iteration number of 3 and a step size of 0.5. A GSM half rate speech traffic channel was used for the simulation. The propagation condition in the simulation is TU50 at 1950 MHz. The frame erasure rate (FIG. 4) and residue bit error rate (FIG. 5) are shown against the cochannel interference level, as specified as reference interference performance by 3GPP.

The XCF-CMIR has been implemented in a 16-bit DSP, for example, and costs 5808 DSP cycles for the CMIR with 3 iterations (~5 MIPS for 4 slots down or 1.5 MIPS for single slot GSM). The performance of the implementation was verified in FIGS. 6 and 7, which shows that the implementation loss is negligible.

Figure 8:
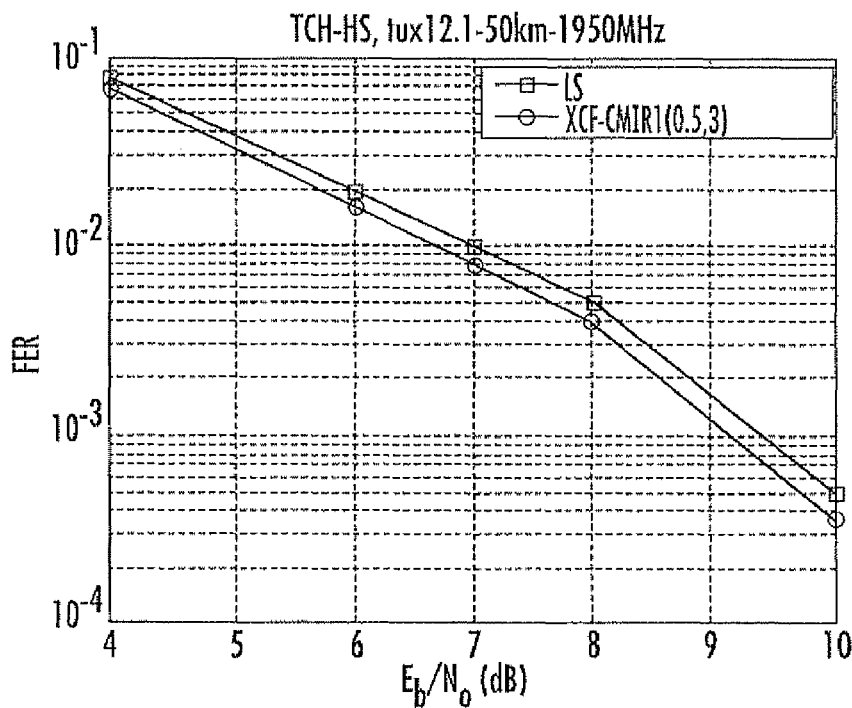
FIG. 8 is a graph showing performance and a frame erasure rate (FER) in accordance with a non-limiting embodiment.
Figure 9:
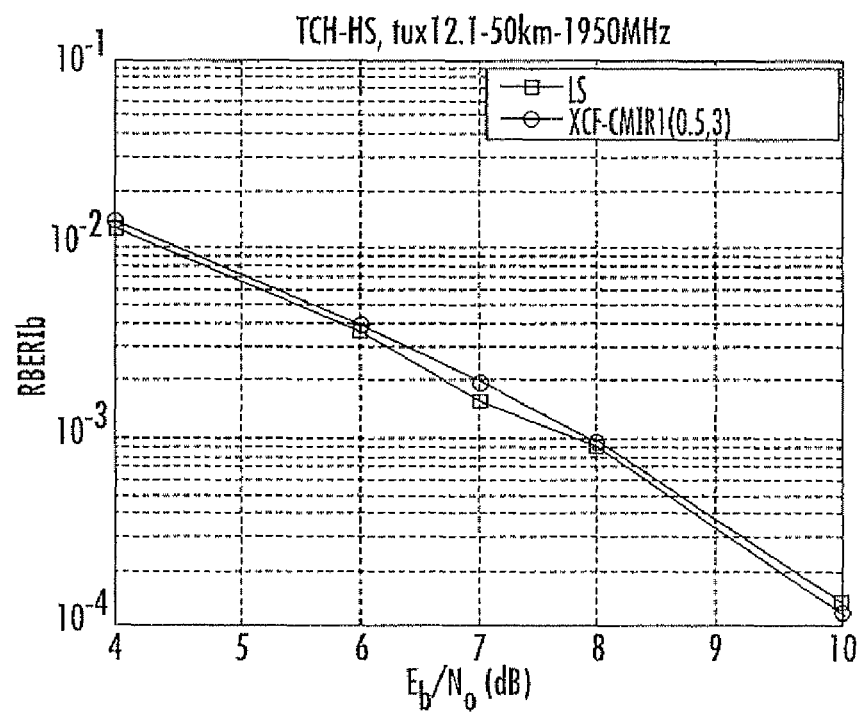
FIG. 9 is a graph showing performance and a residual bit error rate in accordance with a non-limiting embodiment.

The XCF-CMIR also shows improvement in AWGN cases (as specified as reference sensitivity performance by 3GPP). This is shown by FIGS. 8 and 9. The speech channel and propagation condition are the same as those in FIGS. 4 and 5.

In the simulations, the number of trials conducted was 20,000. The method along with the step size and the iterations (enclosed in parentheses) used in the method are shown as the legend in the figures.

The iterative CMIR can be used to improve the accuracy of the CIR estimation. When timing offset is unknown and needs to be jointly estimated, the three algorithms can be applied as described, for example, the LS-CMIR, LS-CMIR1 and XCF-CMIR1 algorithm. The XCF-CMIR1 algorithm reduces the computations greatly while achieving a similar performance as a least squares CMIR. Simulations showed that the XCF-CMIR1 algorithm improves the error rate performance by ~0.5 to 1.5 dB in the interested SIR/SNR regions, comparing to the conventional LS CIR estimator.

Many modifications and other embodiments will come to the mind of one skilled in the art having the benefit of the teachings presented in the foregoing descriptions and the associated drawings. Therefore, it is understood that the specific embodiments disclosed are not limited, and that modifications and embodiments are intended to be included within the scope of the appended claims.

That which is claimed is:

1. A method of processing a communications signal, comprising:
   receiving the communications signal within a communications receiver;
   determining a timing offset as a peak value of cross-correlations between a known training sequence and the received communications signal;
   estimating within a channel estimator circuit of the communications receiver an initial Channel Impulse Response (CIR) of the received communications signal using the determined timing offset; and
   applying a constant modulus interference removal iteration to improve the initial channel impulse estimation.

2. The method according to claim 1, wherein the step of estimating the initial Channel Impulse Response comprises cross-correlating a known training sequence and the received communications signal.

3. The method according to claim 1, which further comprises receiving the communications signal as a burst of transmitted symbols including a known training sequence.

4. The method according to claim 3, wherein the step of estimating an initial Channel Impulse Response further comprises determining a timing offset and cross-correlations of the known training sequence and the received communications signal.

5. The method according to claim 4, which further comprises determining the timing offset by finding the peak cross-correlation between the received signal and the known training sequence.

6. The method according to claim 5, which further comprises estimating the timing offset by finding the maxima of filtered cross-sections wherein an optimized filter length is three for rectangular coefficients.

7. The method according to claim 5, which further comprises randomly distributing the timing offset of the known training sequence of the transmitted symbols over a number of symbols.

8. The method according to claim 1, wherein the constant modulus interference removal iteration is performed at least three times.

9. The method according to claim 1, which further comprises estimating channel parameters as channel impulse response components for estimating the initial channel impulse response.

10. The method according to claim 9, which further comprises applying a least squares (LS) estimation for estimating channel parameters.

11. The method according to claim 1, which further comprises applying the constant modulus interference removal iteration using an equalizer circuit.

12. The method according to claim 11, which further comprises forming the equalizer circuit as one of at least a conventional and single antenna interference cancellation equalizer circuit.

13. The method according to claim 1, which further comprises forming the communications signal in accordance with the global system for mobile communications (GSM).

14. A receiver comprising:
a channel estimator circuit configured to receive a communications signal and estimate channel impulse response components; and
an equalizer circuit configured to receive the channel impulse response components and estimate an initial Channel Impulse Response (CIR) of the received communications signal by determining a timing offset as a peak value of cross-correlations between a known training sequence and received communications signal and estimating an initial channel impulse response using the determined timing offset and said equalizer circuit is configured to apply a constant modulus interference removal iteration to improve the initial channel impulse estimation.

15. The receiver according to claim 14, wherein said equalizer circuit is configured to estimate an initial Channel Impulse Response by cross-correlating a known training sequence and the received communications signal.

16. The receiver according to claim 15, wherein said equalizer circuit is configured to determine a timing offset and cross-correlation of the known training sequence and the received communications signal.

17. The receiver according to claim 16, wherein said equalizer circuit is configured to determine the timing offset by finding the peak cross-correlation between the received signal and the known training sequence.

18. The receiver according to claim 14, wherein said equalizer circuit comprises one of at least a conventional and single antenna interference cancellation equalizer circuit.

19. The receiver according to claim 14, wherein said channel estimator circuit is configured to receive a communications signal as a burst of transmitted signals including a known training sequence of the transmitted signals.

20. The receiver according to claim 14, wherein said communications signal comprises a signal formed in accordance with the global system for mobile communications (GSM).

* * * * *